United States Patent [19]

Frühbuss

[11] Patent Number: 4,710,363

[45] Date of Patent: * Dec. 1, 1987

[54] PROCESS OF REMOVING $SO_x$ AND $NO_x$ FROM WASTE GASES

[76] Inventor: Heinrich Frühbuss, Hubert-Reissnerstr. 5a, 8032 Gräfelfing, Fed. Rep. of Germany

[*] Notice: The portion of the term of this patent subsequent to Dec. 16, 2003 has been disclaimed.

[21] Appl. No.: 910,363

[22] Filed: Sep. 22, 1986

Related U.S. Application Data

[63] Continuation of Ser. No. 674,018, Nov. 21, 1984, Pat. No. 4,629,609.

[30] Foreign Application Priority Data

Nov. 24, 1983 [DE] Fed. Rep. of Germany ....... 3342500

[51] Int. Cl.$^4$ .......................... B01J 8/00; C01B 17/00; C01B 21/00
[52] U.S. Cl. .................................. 423/239; 423/244
[58] Field of Search ............... 423/244 A, 244 R, 239, 423/239 A, 235, 235 D

[56] References Cited

U.S. PATENT DOCUMENTS

| | | | |
|---|---|---|---|
| Re. 29,771 | 9/1978 | Cull et al. | 423/244 X |
| 3,887,683 | 6/1975 | Abe et al. | 423/239 |
| 4,272,497 | 6/1981 | Takahashi et al. | 423/239 |
| 4,400,363 | 8/1983 | Grochowski et al. | 423/239 |
| 4,469,662 | 9/1984 | Hamada et al. | 423/239 |
| 4,500,501 | 2/1985 | Hamada et al. | 423/239 |
| 4,629,609 | 12/1986 | Fruhbuss | 423/239 |

FOREIGN PATENT DOCUMENTS 55-81728  6/1980  Japan .............................. 423/239 A

*Primary Examiner*—Gregory A. Heller
*Attorney, Agent, or Firm*—Michael J. Striker

[57] ABSTRACT

In a process for removing $SO_x$ and $NO_x$ from waste gases, $SO_x$ will quasi-completely be removed from the waste gases either in a first single step or in several steps, and this preferably by means of adsorption cokes (activated carbon) of an adsorptive capacity for $SO_2$ of above 40 g $SO_2$ per KG of coke, whereupon the thus pre-cleaned gas will be subjected to a secondary treatment after admixture of $NH_3$ using catalysts of an absorptive capacity for $SO_2$ of below 10 g $SO_2$ per KG of catalyst, preferably below 5 g of catalyst, by reduction of $NO_x$ to $N_2$.

2 Claims, 1 Drawing Figure

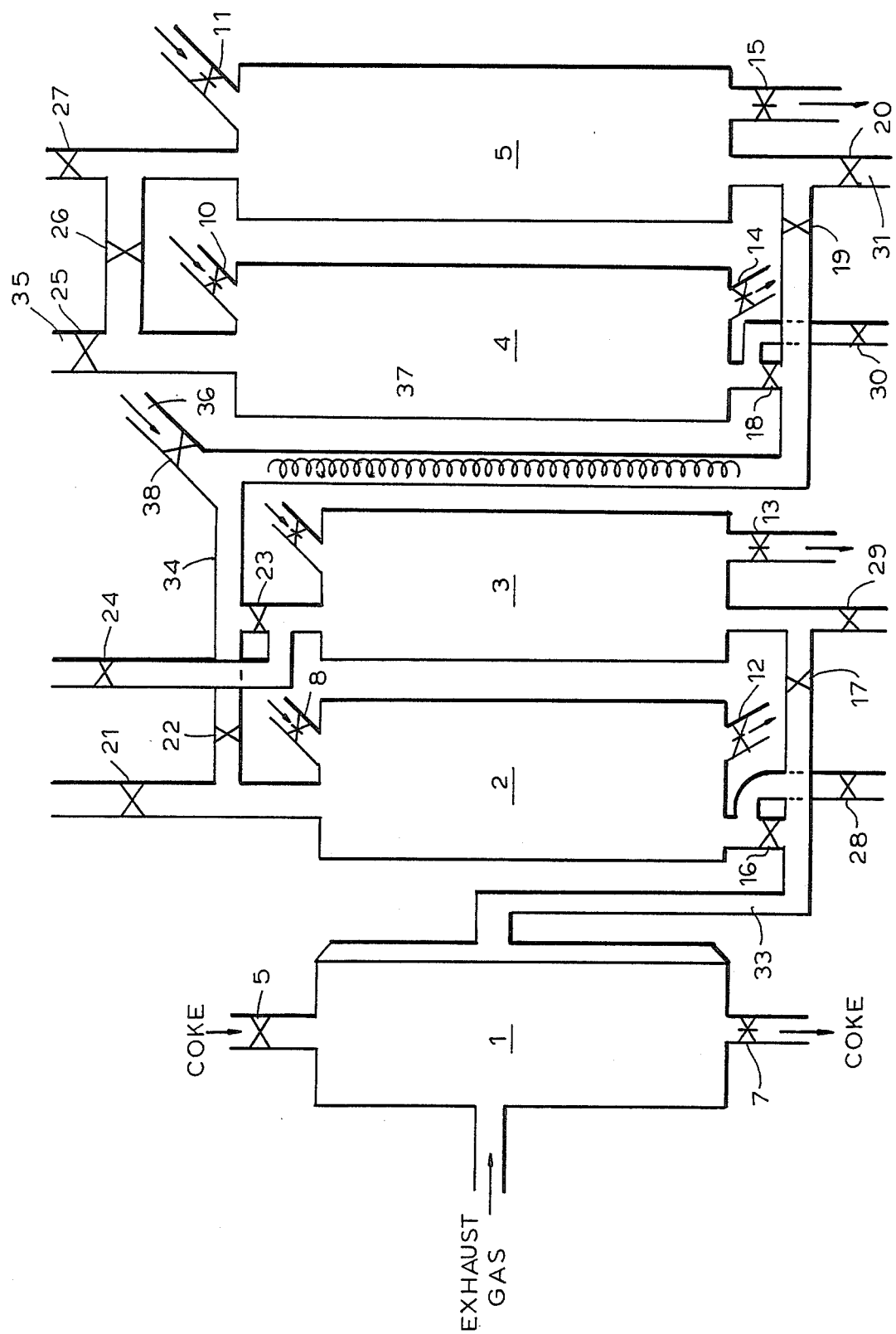

PROCESS OF REMOVING $SO_x$ AND $NO_x$ FROM WASTE GASES

This application is a continuation of application Ser. No. 674,018 filed on Nov. 21, 1984 and now issued to U.S. Pat. No. 4,629,609.

The present invention refers to a process of removing $SO_x$ and $NO_x$ from waste gases. These oxides are present in varying proportions in the waste gases and stem in particular from burning of combustibles and nitrogen-containing waste and, due to the noxious effect on the environment, have to be removed prior to gas discharge from the stack.

According to a well-known practice $SO_x$ is removed from gases in a dry-type process, between 70° and 200° C., by means of activated carbon and in the presence of ammonium. In this case $NO_x$ is partially reduced to $N_2$, especially if the activated carbon has been impregnated by vanadium pentoxide or by catalysts of a similar effect. The method inevitably leads to an enrichment of the activated carbon with salts, e.g. ammonium sulphate and ammonium nitrate. The activated carbon, therefore, needs continuous replacement and/or reactivation. It is furthermore an established practice to adsorb in a first process step most of the $SO_x$ and to reduce in a second step, upon addition of $NH_3$, the $NO_x$ to $N_2$ by means of cokes which also have a relatively good adsorptive capacity for $SO_2$. As the $NO_x$ is most efficiently reduced by fresh activated carbon, it has been suggested to use up, during the first step, all of the coke charged with $SO_2$ in the second step and to run the second step always with fresh activated carbon. This will, however, not avoid a relatively fast contamination of the activated carbon of the second step by ammonium sulphate and ammonium nitrate.

According to the present invention, however, the second step is run on a catalyst whose adsorptive capacity for $SO_2$ is below abt. 10 g $SO_2$, preferably below 5 g, for each KG of catalyst. The beneficial effect of this procedure and of precedent thorough removal of the $SO_x$ from the waste gas will be that rapid contamination of the costly catalyst is avoided and its effectiveness thus considerably extended.

The invention thus refers to a method of removing $SO_x$ and $NO_x$ from waste gases and is characterized by that either in a first (single) step or in several steps $SO_x$ is quasi-completely removed from the waste gas, whereupon the thus pretreated gas will, after admixture of $NH_3$, be subjected to a secondary purification by means of catalysts of an adsorptive capacity of below 10 g $SO_2$ per KG of catalyst, preferably below 5 g per KG of catalyst, which reduce the $NO_x$ to $N_2$. In this case $NH_3$ will be admixed barely in a volume required for effecting the reduction—roughly according to the formula $2 NO_x + 2 NH_3 \rightarrow 2 N_2 + 3 H_2O$—since the reaction between $NO_x$ and $NH_3$, provided thorough mixing of the gases, is essentially a quantitative one.

The complete or quasi-complete removal of $SO_x$ from the waste gas (ideally down to 400 ppm $SO_x$) can be brought about either by means of adsorption cokes (activated carbon) whose adsorptive power for $SO_2$ is preferably above 40 g per KG of coke, or of wet scrubbing, e.g. on a Ca ion basis and, if need be, by subsequent dry purification.

According to the invention, the second process step is run on catalysts having the said low adsorptive capacity for $SO_2$ and being, moreover, highly effective in reducing the $NO_x$ to $N_2$. They are, in particular, catalysts containing the effective constituents Al-, Cu-, Ko-, Ni-, Fe- and/or vanadium oxide. As carrier substances for these oxides have to be considered specifically the known granular refractory materials based on $\alpha$ or $\gamma$ $Al_2O_3$, $SiO_2$ and/or $CaO$, thus also fire-clay and sillimanite.

Owing to their good reactivating properties, are used for the second process step preferably those cokes which are impregnated with the said catalytically effective oxides. As carrier substance can be used all those cokes possessing the desirable low adsorptive power for $SO_2$. Said cokes may have been produced by thermal treatment of carbonaceous materials under exclusion of air, at 300° up to 600° C. or, alternatively, at higher temperatures up to above 1000° C. As mentioned earlier, among the effective oxides are those of copper, cobalt, nickel, iron, aluminium and/or vanadium.

According to a preferred embodiment of the invention, the coke of the second process step will be a coke produced from the treatment of a mineral oil. These cokes will generally contain less than 10% volatiles and abt. 0.5 up to 3% by wt. of vanadium pentoxide and/or other metal oxides. It is recommended to subject these cokes—prior to feeding them to the second process step viz. the appertaining vessel—to a thermal treatment under exclusion of air, between 300° and 800° C. It is also in this temperature range that their from time to time necessary reactivation is brought about.

A specific advantage of the process of this invention should be seen in that during the second process step any continuous substitution of the catalyst bed can be done with, given the extraordinarily long-lasting effectiveness of the relevant catalyst. As a consequence, two simple vessels which can be switched over to the waste gas may be used instead of the complicated and defect-prone moving bed reactors.

A from time to time required reactivation of the catalyst may be done either using inert gas, waste gas, or steam or other, preferably reducing gases, at 300° to 800° C.

One advantage of using cokes as carrier material is that spent cokes can either be burnt or possibly transformed into activated carbon.

To determine the adsorptive capacity of the cokes of the first step as well as of the catalyst of the second step, a 50 cm high column consisting of the to be tested coke was flown through in upward direction by a waste gas containing 0.5% by vol. of $SO_2$, 19.5% by vol. of $CO_2$ and 80% by vol. of $N_2$, at 150° C., until a $SO_2$ breakthrough was found in the gas discharge. From the lower half of the coke column was then determined by way of analysis—by aeration with $N_2$ at 200° C.—the adsorptive capacity for $SO_2$ per KG of coke. The adsorptive capacity of the catalysts to be used in the second process step was determined similarly.

BRIEF DESCRIPTION OF THE DRAWING

The invention will be explained more in detail, hereafter, by way of the enclosed drawing. The plant consists of the moving bed reactor 1 and of the vessels 2 through 5 for batchwise feed of coke and catalyst.

Figure numbers 6 and 7 denote the locks for continuous feed and withdrawal of coke, whereas figure numbers 8 through 15 denote the locks for the batchwise feed and withdrawal of cokes and catalysts.

Valves 16 and 20 serve for adjusting the supply of waste gases to vessels 2 through 5, whereas valves 21 through 27 are meant for adjusting the discharge of gases from the above vessels.

The supply pipes 28 through 31 are for feeding hot gases to the system.

Gas purification in the vessels 1, 2 and 4 as well as the reactivation of cokes and catalysts in vessels 3 and 5 is done with the following valve setting (+ stands for opened, — for closed): 16+; 17—; 21—; 22+; 23—; 18+; 19—; 25+; 26—.

The gas flows via duct 12 through vessel 1, duct 13, vessel 2, duct 34 into vessel 4 and is discharged to the atmosphere via duct 35.

In the meantime, the cokes in vessels 3 and 5 can be reactivated by hot gases, with valve settings 29+; 24+ as well as 20+ and 27+.

Similar valve settings apply to the operation of vessels 3 and 5 and to the simultaneous reactivation of vessels 2 and 4 viz. to the operation of vessels 2 and 5 and reactivation of vessels 3 and 4.

Depending on the effectiveness of the activated cokes in reactor 1, which latter may be of a discretional construction height, vessels 2 and 3 can be dispensed with.

$NH_3$ is introduced via duct 36 and valve 38 in duct 34. The coil incorporated in duct 34 is meant to promote mixing of the pretreated waste gases with $NH_3$.

EXAMPLE

A waste gas is passed, at 700 $h^{-1}$ space velocity (referred to normal temperature) through a reactor 1 of 1 m cross-section and 6 m height. This waste gas contains 0.07% by vol. of $NO_x$ and 0.1% by vol. of $SO_x$, besides $O_2$, $CO_2$ and $N_2$ in varying proportions. The moving bed of reactor 1 consists of low-temperature coke having an adsorptive capacity of 45 g $SO_2$ per KG. Vessels 2 and 3 are filled with similar coke. On its discharge from reactor 1 the waste gas contains 0.01% by vol. of $SO_x$ which are reduced to 0.005% by vol. upon the gas having passed through vessel 2.

To this precleaned waste gas will then be admixed via duct 36, $NH_3$ in a volume of 0.8% by vol. (referred to the waste gas). The waste gas then flows through vessel 4 which is filled with an $Al_2O_3$ catalyst having been impregnated by 0.05% by wt. of copper oxide and iron oxide and possessing an adsorptive capacity for $SO_2$ of 1 g $SO_2$ per KG of catalyst. In the waste gas discharged from duct 35 no traces of $NO_x$ were found The same result was achieved when vessel 4 had been filled with a catalyst of vanadium-containing petrol coke.

For manufacturing of the above catalyst, a coke-like mineral oil residue containing 4% vanadium pentoxide and having a granular size between 2 and 20 mm was heated to 650° C. in a rotary furnace in order to remove the remaining volatile matter. Upon cooling down the material was ground between 0.05 and 1.5 mm, then intimately blended with 20% by wt. of pitch (softening point according to Krämer-Sarnow: 40° C.) and 15% by wt. of water and passed through an extruder to give moulded shapes of 4 mm diameter.

The moulded shapes were gradually heated to 650° C. in a rotary furnace under exclusion of air and then allowed to cool down after 30 minutes.

In the above manner coke-like residues from mineral oil treatment can be completely (100%) transformed into catalysts. Instead of the said procedure the mineral oil residues may, alternatively, be reduced carefully to abt. 4 mm grain size. These fractions will, however, not be of the same high abrasive strength as the moulded cokes whose catalytic effectiveness is—surprisingly—not affected by binding them to pitch, bitumen or the like.

Although the process according to the invention was explained by way of dry adsorption of $SO_2$, the quasi complete adsorption of $SO_x$ may be achieved as well by wet scrubbing for the obvious reason that the effectiveness of the following catalysts will, in general, not be impaired by steam.

I claim:

1. Process of removing $SO_x$ and $NO_x$ from waste gases which comprises the steps of and in sequence
    (1) removing substantially all of the $SO_x$ present in the gas by contacting said waste gas with an adsorptive coke having an adsorption capacity for $SO_2$ of above 40 g $SO_2$ per kg of coke,
    (2) introducing $NH_3$ into the gas now substantially free of $SO_x$,
    (3) subjecting the $NH_3$ containing gas to contact with a catalyst having an adsorptive capacity for $SO_2$ of below, 10 g per kg of catalyst containing as effective ingredient at least one member of the group of aluminum, copper, cobalt, nickel, iron and vanadium oxide supported on a granular refractory material for reducing the $NO_x$ to $N_2$, and
    (4) recovering the $SO_x$ and $NO_x$ free gas.

2. Process of removing $SO_x$ and $NO_x$ from waste gases which comprises the steps of and in sequence
    (1) removing substantially all of the $SO_x$ present in the gas by contacting said waste gas with an adsorptive coke having an adsorption capacity for $SO_2$ of above 40 g $SO_2$ per kg of coke,
    (2) introducing $NH_3$ into the gas now substantially free of $SO_x$,
    (3) subjecting the $NH_3$ containing gas to contact with a catalyst having an adsorptive capacity for $SO_2$ of below, 10 g per kg of catalyst containing as effective ingredient at least one member of the group of aluminum, copper, cobalt, nickel, iron and vanadium oxide supported on a granular refractory material selected from the group consisting of $Al_2O_3$, $SiO_2$, CaO, fire clay and silimanite for reducing the $NO_x$ to $N_2$, and
    (4) recovering the $SO_x$ and $NO_x$ free gas.

* * * * *